United States Patent [19]
Tanaka

[11] Patent Number: 5,249,650
[45] Date of Patent: Oct. 5, 1993

[54] MOTORCYCLE FRONT WHEEL DISC BRAKE ARRANGEMENT

[75] Inventor: Toyoji Tanaka, Iwata, Japan

[73] Assignee: Yamaha Hatsudoki Kabushiki Kaisha, Iwata, Japan

[21] Appl. No.: 786,537

[22] Filed: Nov. 1, 1991

[30] Foreign Application Priority Data

Nov. 30, 1990 [JP] Japan ................. 2-340846

[51] Int. Cl.⁵ ............................... B62L 1/02
[52] U.S. Cl. ................... 188/344; 188/72.5; 280/276
[58] Field of Search ........ 188/71.1, 72.1, 72.4, 188/72.5, 370, 344, 73.1, 73.33, 361; 180/219; 280/275, 276, 666

[56] References Cited

U.S. PATENT DOCUMENTS

| 2,728,420 | 12/1955 | Wright et al. | 188/72.5 X |
| 2,799,367 | 7/1957 | Dotto | 188/72.5 |
| 2,926,757 | 3/1960 | Armstrong | 188/72.5 X |
| 4,093,043 | 6/1978 | Smith | 188/72.5 X |
| 4,526,249 | 7/1985 | Parker | 188/26 X |
| 4,785,905 | 11/1988 | Trema | 280/275 X |
| 4,828,069 | 5/1989 | Hatsuyama | 280/275 X |
| 4,884,663 | 12/1989 | Trema | 188/344 X |

FOREIGN PATENT DOCUMENTS 0376802  7/1990  European Pat. Off. ............ 280/276

*Primary Examiner*—Robert J. Oberleitner
*Assistant Examiner*—Peter M. Poon
*Attorney, Agent, or Firm*—Ernest A. Beutler

[57] ABSTRACT

A motorcycle front wheel and disc brake assembly wherein the caliper of the disc brake assembly is supported directly by an axle carrier of the front wheel and is nested between the axle carrier and the front wheel. The caliper assembly is mounted centrally on the axle carrier so as to minimize the length of its supporting bracket and to reduce adverse effects on the suspension and steering of the front wheel.

7 Claims, 4 Drawing Sheets

MOTORCYCLE FRONT WHEEL DISC BRAKE ARRANGEMENT

BACKGROUND OF THE INVENTION

This invention relates to a motorcycle front wheel disc brake arrangement and more particularly to an improved suspension and braking arrangement for the front wheel of a motorcycle.

One form of motorcycle front wheel suspension arrangement which has a number of advantages employs an axle carrier that is disposed at one side of the front wheel and which is connected for steering movement to the handlebar assembly. This axle carrier is supported from the motorcycle frame for suspension movement by means of a leading arm assembly. The leading arm may either comprise a single arm or a pair of arms.

Although this type of suspension arrangement has a number of advantages, it is also necessary to provide an arrangement for braking the rotation of the front wheel and this must be suspended at least in part from the axle carrier. Conventionally this has been done by having a forwardly extending bracket carried by the axle carrier and which carries the caliper of a disc brake assembly. However, such arrangements have some disadvantages. In the first instance, when the caliper assembly extends forwardly, this provides an unsprung mass that is offset from the steering axis and can provide undesirable steering and suspension operation. Furthermore, the cantilevered type of construction for the caliper assembly requires a heavy supporting bracket which further aggravates the aforenoted problems. In addition, the bracket mounting can position the caliper in a location that can cause it to be subject to damage.

It is, therefore, a principal object of this invention to provide an improved front wheel suspension and disc brake assembly for a motorcycle.

It is a further object of this invention to provide a motorcycle front wheel suspension and disc brake assembly wherein the brake is mounted directly from the axle carrier and is protected by it.

It is a further object of this invention to provide a front wheel suspension and disc brake assembly wherein the axle carrier mounts directly the disc brake caliper and the disc brake caliper is centrally positioned on the axle carrier.

SUMMARY OF THE INVENTION

This invention is adapted to be embodied in a front wheel suspension and braking assembly for a motorcycle having a frame and a front wheel. A generally vertically extending axle carrier lies on one side of the front wheel and rotatably journals the front wheel about an axis. A brake rotor is fixed for rotation with the front wheel and is journaled by the axle carrier. A brake caliper is carried by the axle carrier and is disposed substantially centrally thereon in side view. Braking means are operated by the brake caliper for braking rotation of the brake rotor.

DESCRIPTION OF THE PREFERRED EMBODIMENT OF THE INVENTION

Figure 1:
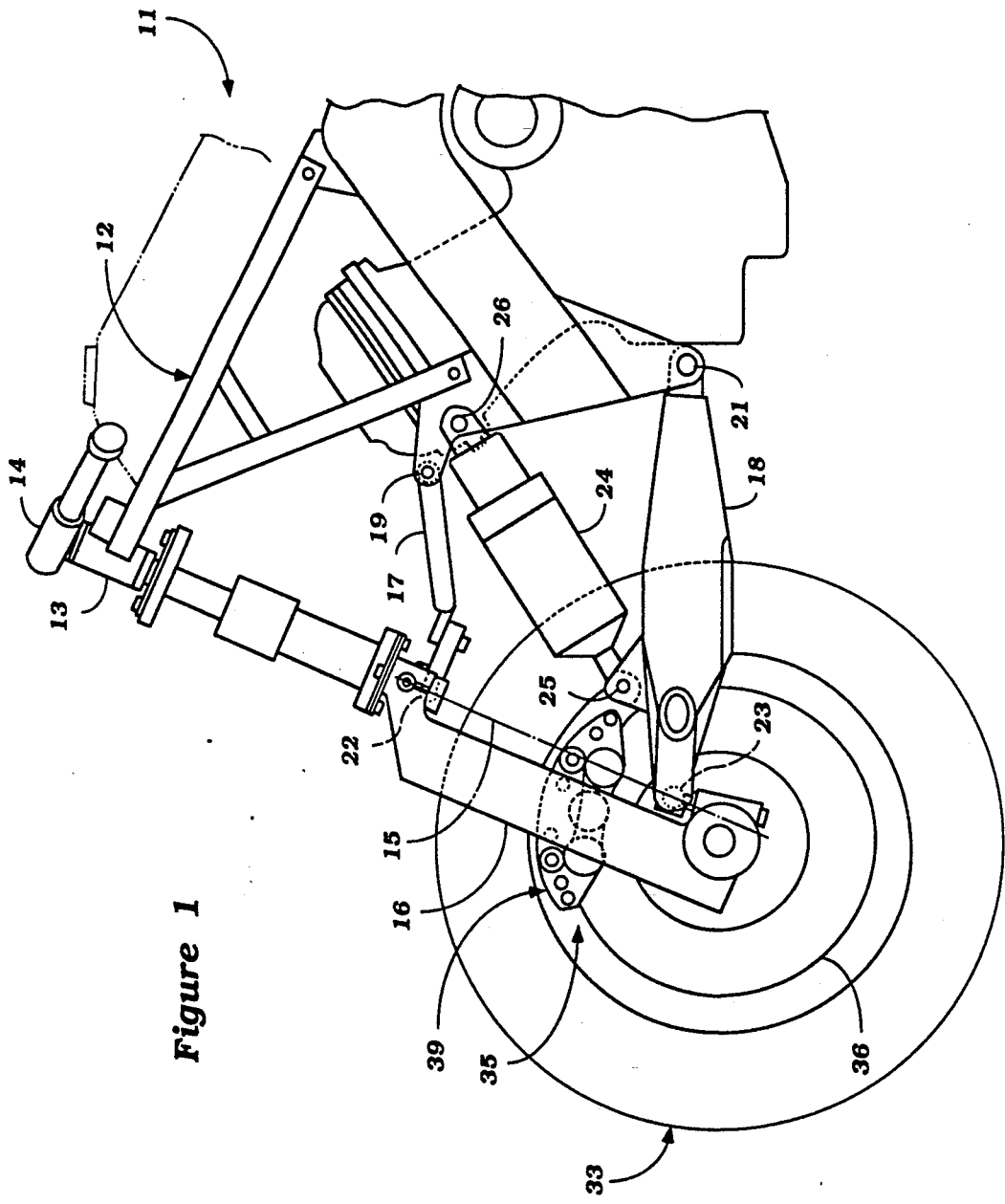
FIG. 1 is a partial side elevational view showing the front portion of a motorcycle having a front wheel suspension and disc brake assembly constructed in accordance with an embodiment of the invention.

Referring first in detail to FIG. 1, a motorcycle having a front wheel suspension and braking arrangement in accordance with an embodiment of the invention is shown partially and is identified generally by the reference numeral 11. Since the invention deals with the front wheel of the motorcycle, only the forward portion of the motorcycle 11 has been depicted.

The motorcycle 11 has a frame assembly, indicated generally by the reference numeral 12 and which is comprised of a welded assembly that includes a head pipe 13 that journals a handlebar 14 for dirigible movement about a steering axis, indicated by the phantom line 15.

An axle carrier, indicated by the reference numeral 16 is connected to the handlebar assembly 14 in a manner as described in co-pending application entitled Double Swing Arm Motorcycle Front Suspension, Ser. No. 786,733, filed Nov. 1, 1991 in the names of Ichiro Kurawaki Toyoji Tanaka and Kazumasa Nakaya and assigned to the assignee hereof. This assembly also permits suspension movement of the axle carrier 16 as described therein. The disclosure of that application is incorporated herein by reference.

The axle carrier 16 is supported for suspension movement relative to the frame assembly by a means of a pair of leading arms, comprised of an upper arm 17 and a lower arm 18. The arm 17 and 18 have spaced apart pivotal connections 19 and 21 to elements of the frame assembly 12, as described in the aforenoted application. At their front ends, the arms 17 and 18 have ball joint connections 22 and 23 to the axle carrier 16 for supporting the axle carrier 16 for suspension movement and also for steering movement about the steering axis 15. A combined shock absorber spring assembly 24 is loaded upon suspension movement by a pivotal connection 25 to the lower arm 18 and a pivotal connection 26 to the frame 12. Since this construction is described in detail in the aforenoted co-pending application and since the suspension per se forms no part of the invention in this application, further description of it is believed to be unnecessary.

Figure 2:
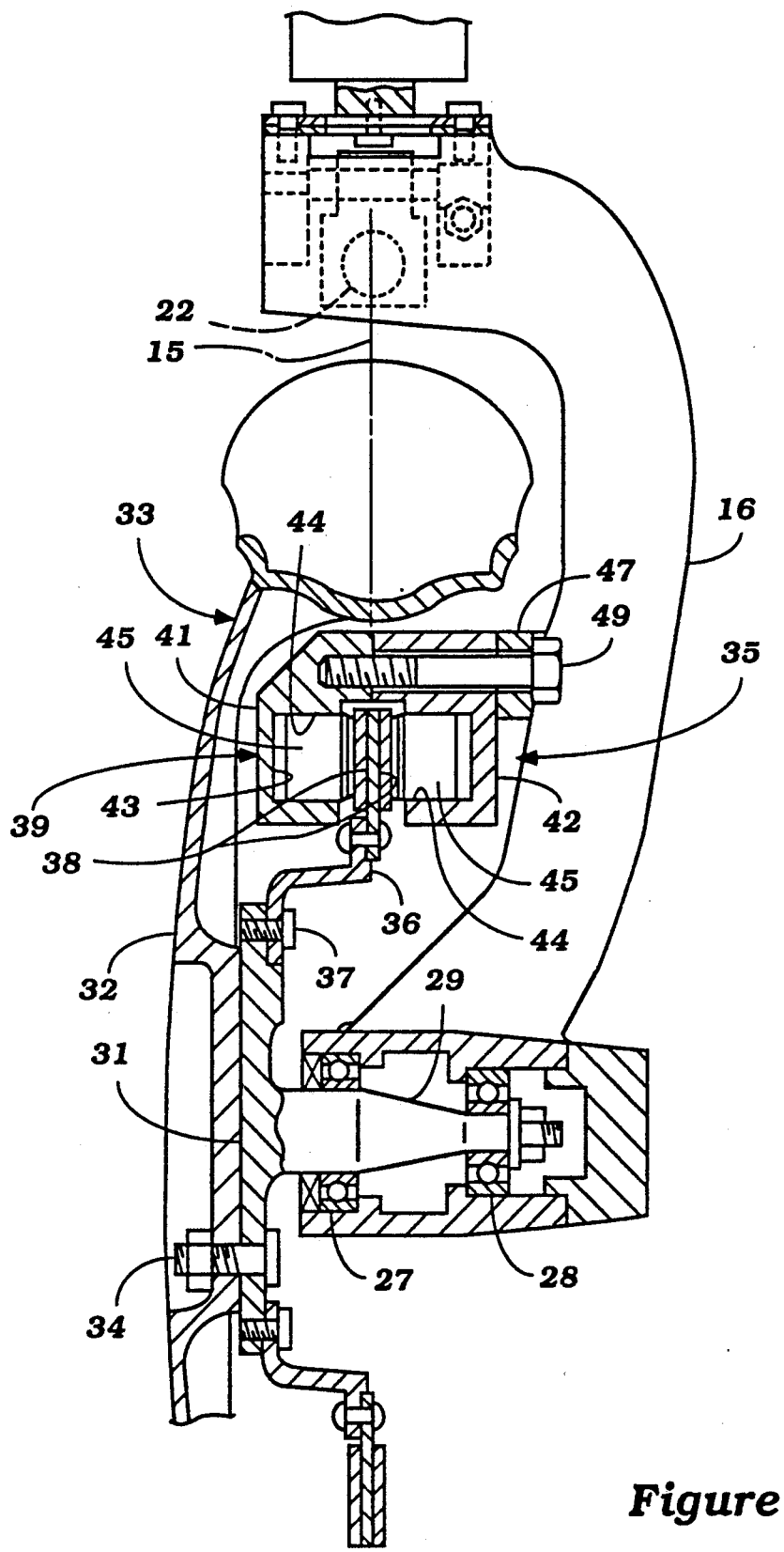
FIG. 2 is an enlarged cross sectional view taken through the center of rotation of the front wheel and generally parallel to the steering axis.
Figure 3:
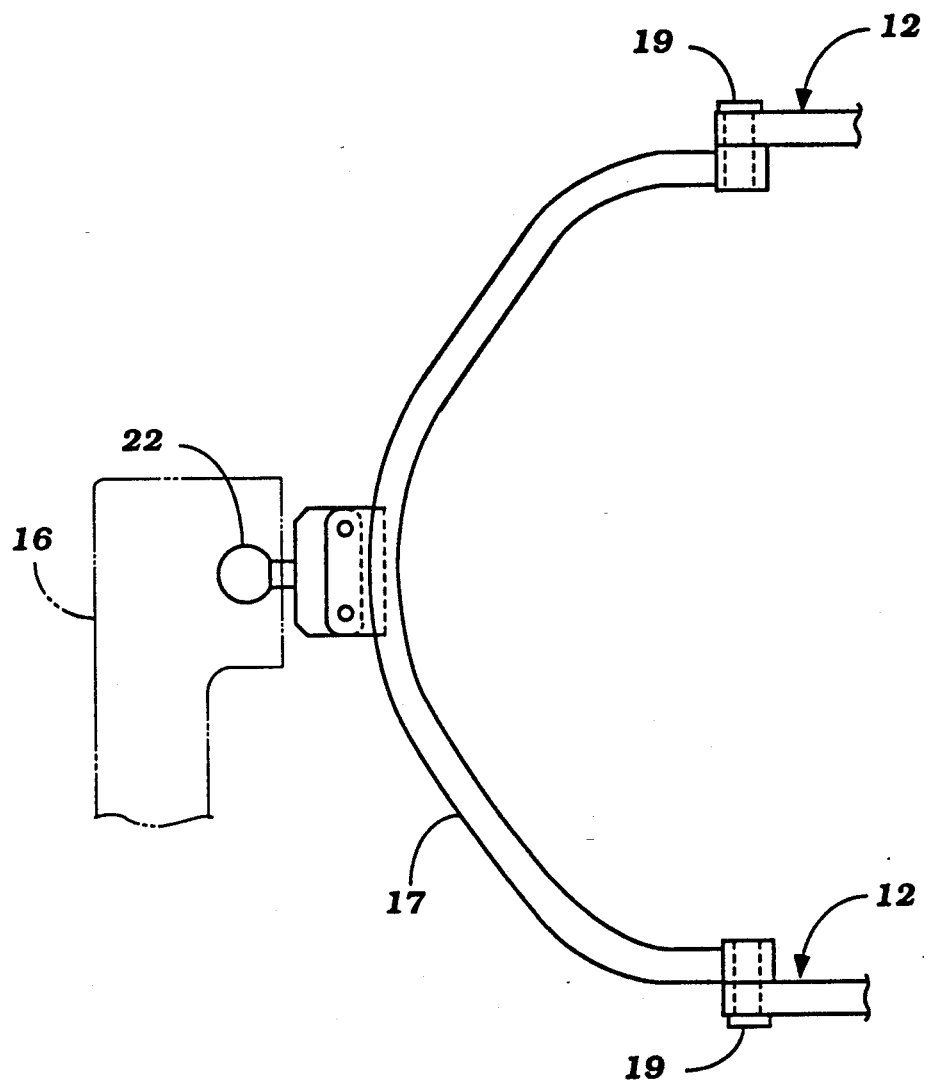
FIG. 3 is a top plan view showing a portion of the front upper suspension arm.
Figure 4:
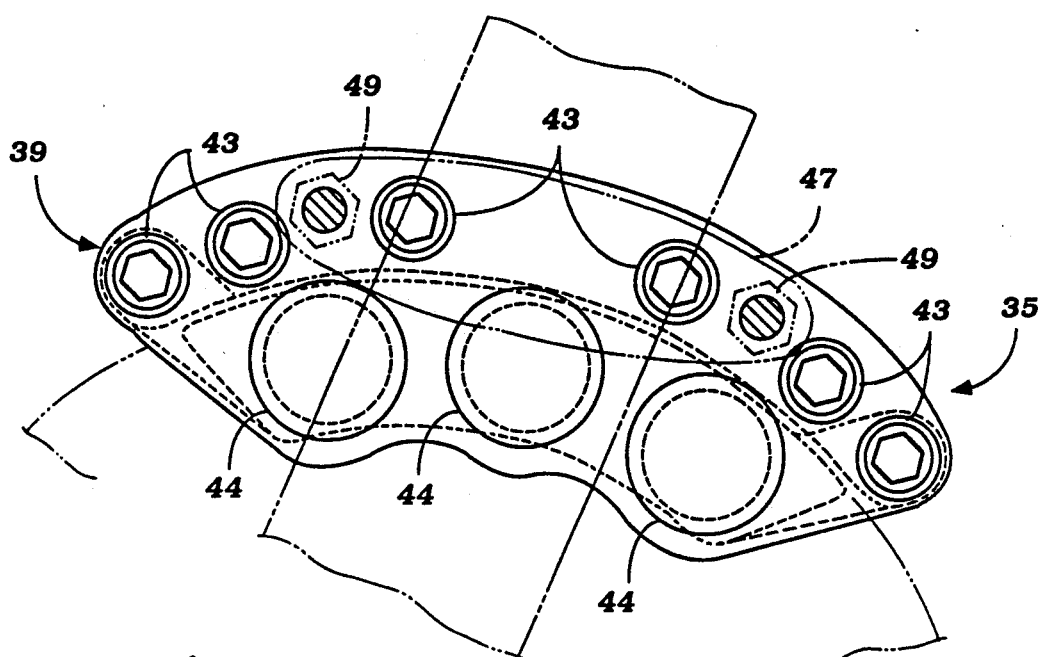
FIG. 4 is a further enlarged side elevational view showing the disc brake caliper and the mounting arrangement therefore.
Figure 5:
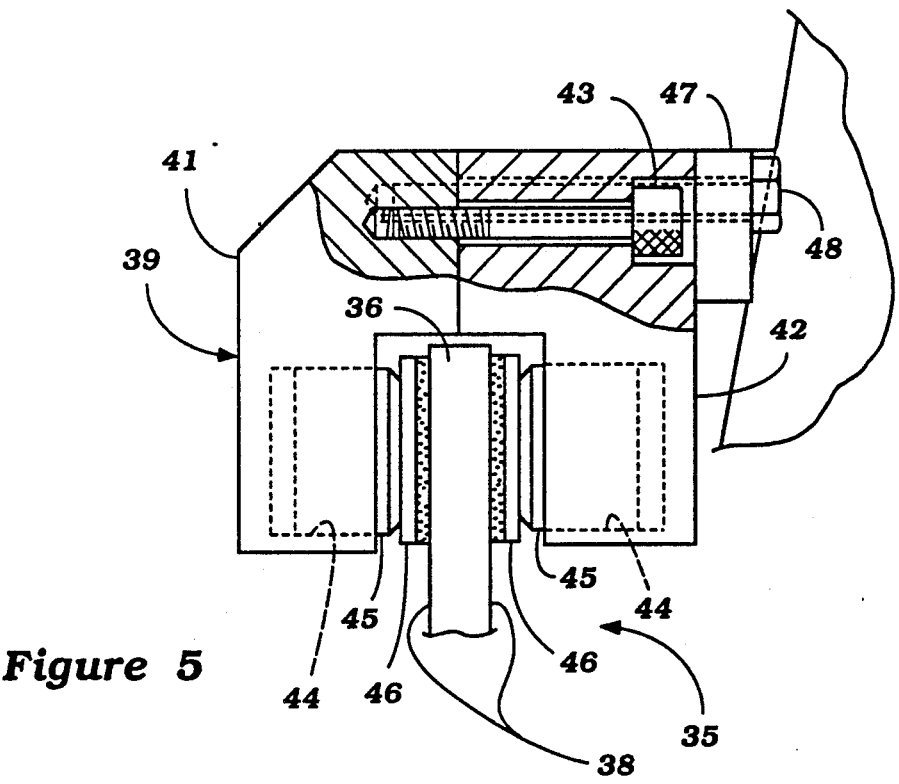
FIG. 5 is a side elevational view of the disc brake caliper and mounting arrangement, with a portion broken away and shown in section.

Referring now additionally to FIG. 2, it will be noted that the lower end of the axle carrier 16 is provided with a pair of spaced apart bearings 27 and 28 which journal an axle shaft 29. The axle shaft 29 has a disc or flange portion 31 to which the center 32 of a front wheel and tire assembly, indicated generally by the reference numeral 33 is affixed by stud and nut assemblies 34. This, therefore, provides rotational support for the front wheel and tire assembly 33 on the lower end of the axle carrier 16 The rotational axis defined by the axle 29 is slightly forwardly of the steering axis as may be readily seen in FIG. 1.

A disc brake assembly, indicated generally by the reference numeral 35 and shown in most detail in FIGS. 1, 2, 4 and 5, is associated with the front wheel and tire assembly 33 for braking its rotation. This disc brake assembly 35 includes a brake rotor or disc 36 that is affixed for rotation with the flange 31 of the axle 29 by means of threaded fasteners 37. The brake rotor 36 is disposed so that it lies centrally on the steering axis 15 in front elevational view as shown in FIG. 2 although its rotational axis is disposed forwardly of the steering axis 15. This also centralizes the brake rotor 36 and specifically its oppositely facing braking surfaces 38 on opposite sides of but close to the center of the front wheel and tire 33.

A caliper assembly, indicated generally by the reference numeral 39 is carried by the axle carrier 16 for cooperation with the brake rotor braking surfaces 38 for braking their rotation. In the illustrated embodiment, the caliper 39 is of the six pot fixed type. It is to be understood, however, that the invention may be employed with other type of disc brake calipers. The caliper assembly 39 includes facing halves 41 and 42 that are fixed to each other by means of socket headed screws 43. These halves 41 and 42 are each provided with three bores 44 in which respective pistons 45 are slidably supported. The bores 44 are pressurized from a remotely positioned master cylinder (not shown) in a known manner. Brake pads 46 are disposed between the pistons 45 and the respective rotor braking surfaces 38. When the bores 44 are pressurized, the pistons 45 will urge the brake pads 46 into frictional contact with the rotor braking surfaces 38 for braking the rotation of the front wheel 33 in a known manner.

A relatively short supporting bracket 47 is welded to the inboard side of the axle carrier 16 between the caliper assembly 39 and the axle carrier 16. A pair of bolts 48 affix the caliper assembly 39 to this supporting bracket 47. It should be noted that the construction is such that the center piston 45 of each side of the caliper 39 lies substantially midway between the fore and aft portions of the axle carrier 16 while the rearward most piston 45 lies on the steering axis 15. As a result, an extremely short bracket may be employed and there will be very little moment loading on the bracket 46 so that it can be very light in weight. Furthermore, the mass of the caliper assembly 39 and its associated components is centralized on the axle carrier 16 so as to minimize adverse suspension and steering effects.

It should be readily apparent that the described construction provides a very effective front wheel disc brake assembly for a motorcycle having an axle carrier type of front suspension and wherein the caliper assembly is protected by being nested between the axle carrier and the front wheel. Of course, the foregoing description is that of a preferred embodiment of the invention and various changes and modifications may be made without departing from the spirit and scope of the invention, as defined by the appended claims.

We claim:

1. A front wheel suspension and brake assembly for a motorcycle having a frame, a front wheel, a generally vertically extending axle carrier lying on one side of said front wheel and supported for steering movement about a steering axis offset from said axle carrier, said axle carrier rotatably journaling said front wheel about a rotational axis, a brake rotor fixed for rotation with said front wheel and journaled by said axle carrier for rotation about said rotational axis, a brake caliper carried by said axle carrier and disposed substantially centrally thereon in side view, and braking means operated by said brake caliper for braking the rotation of said brake rotor comprising a first piston aligned with said axle carrier, a second piston disposed forwardly of said axle carrier and a third piston disposed rearwardly of said axle carrier, one of said second and third pistons lying on said steering axis.

2. A front wheel suspension as set forth in claim 1 wherein the caliper is nested between the axle carrier and the front wheel to be protected thereby.

3. A front wheel suspension as set forth in claim 1 wherein the axle carrier is disposed forwardly of the steering axis.

4. A front wheel suspension as set forth in claim 1 wherein the axle carrier is supported for suspension movement relative to the frame by means of at least one pivotally mounted leading arm.

5. A front wheel suspension as set forth in claim 4 wherein the axle carrier is supported by means of a pair of leading arms.

6. A front wheel suspension as set forth in claim 5 wherein the caliper is nested between the axle carrier and the front wheel to be protected thereby.

7. A front wheel suspension as set forth in claim 6 wherein the axle carrier is disposed forwardly of the front wheel steering axis.

* * * * *